(12) United States Patent
An

(10) Patent No.: US 12,304,370 B2
(45) Date of Patent: May 20, 2025

(54) HOT WATER SEAT SYSTEM OF FUEL CELL VEHICLE AND METHOD FOR CONTROLLING THE SAME

(71) Applicants: Hyundai Motor Company, Seoul (KR); Kia Corporation, Seoul (KR)

(72) Inventor: Chi Young An, Cheongju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 334 days.

(21) Appl. No.: 18/172,011

(22) Filed: Feb. 21, 2023

(65) Prior Publication Data

US 2024/0051443 A1  Feb. 15, 2024

(30) Foreign Application Priority Data

Aug. 10, 2022  (KR) .................. 10-2022-0100084

(51) Int. Cl.
*B60N 2/56*  (2006.01)
*B60L 50/70*  (2019.01)

(52) U.S. Cl.
CPC ............ *B60N 2/5614* (2013.01); *B60L 50/70* (2019.02)

(58) Field of Classification Search
CPC ......... B60N 2/56; B60N 2/5614; B60L 50/70; H01M 8/04052; H01M 2250/20
USPC ..................................... 297/180.15
See application file for complete search history.

(56) References Cited

U.S. PATENT DOCUMENTS

| 8,678,492 | B2 * | 3/2014 | Benton | ............... B60N 2/5692 |
| | | | | 297/180.14 |
| 11,161,436 | B1 * | 11/2021 | Graham | ............... B60N 2/5614 |
| 2014/0217786 | A1 * | 8/2014 | Stremmel | ............ B60N 2/5614 |
| | | | | 297/180.15 |

FOREIGN PATENT DOCUMENTS

| GB | 2278432 A | * 11/1994 | ......... B60H 1/00285 |
| KR | 20-1998-0051179 U | 10/1998 | |
| KR | 10-1999-0040150 A | 6/1999 | |
| KR | 10-1405753 B | 6/2014 | |

* cited by examiner

*Primary Examiner* — Milton Nelson, Jr.
(74) *Attorney, Agent, or Firm* — Fish & Richardson P.C.

(57) ABSTRACT

Disclosed is a hot water seat system of a fuel cell vehicle including a hot water circulating part configured to adjust a temperature of hot water to a preset target temperature range, a processor configured to control a flow of the hot water, and a hot water seat having a hot water pipe, in which the temperature adjusted hot water flows via the hot water circulating part, and the hot water circulating part includes a first water tank configured to receive the hot water discharged from the fuel cell stack, and a second water tank configured to supply the temperature adjusted hot water in the target temperature range to the hot water seat.

20 Claims, 9 Drawing Sheets

HOT WATER SEAT SYSTEM OF FUEL CELL VEHICLE AND METHOD FOR CONTROLLING THE SAME

CROSS-REFERENCE TO RELATED APPLICATION

This application claims priority from Korean Patent Application No. 10-2022-0100084, filed in the Korean Intellectual Property Office on Aug. 10, 2022, the disclosure of which is incorporated herein by reference in its entirety.

TECHNICAL FIELD

The present disclosure relates to a hot water seat system of a fuel cell vehicle and a method for controlling the same, and relates to a technology for providing heat to a passenger seat while reducing power consumption.

BACKGROUND

A fuel cell vehicle travels as a motor is driven by using a fuel cell stack that produces electricity. The fuel cell (FC) stack produces electricity through an oxidation/reduction reaction of hydrogen and oxygen ($O_2$).

The fuel cell vehicle can use electric power produced by the fuel cell vehicle or can use a battery provided at an interior of the vehicle to operate various accessory devices in the vehicle.

That is, the fuel cell vehicle can include a heating seat, and the heating seat can use the electric power of the fuel cell stack or the battery. Because high power consumption is necessary to operate the heating seat, a burden of a power supply source in the vehicle is increased. In particular, power consumption of a large-scale vehicle, such as a bus, which has a large number of seats, may be increased excessively due to the large number of heating seats.

Accordingly, a method for increasing a temperature of a passenger seat while reducing power consumption is necessary.

SUMMARY

The present disclosure describes a hot water seat system of a fuel cell vehicle that may reduce power consumption, and a method for controlling the same.

The present disclosure also describes a hot water seat system of a fuel cell vehicle for minimizing additional configurations of a heating mechanism to increase a temperature of hot water in a seat, and a method for controlling the same.

The technical problems to be solved by the present disclosure are not limited to the aforementioned problems, and any other technical problems not mentioned herein will be clearly understood from the following description by those skilled in the art to which the present disclosure pertains.

According to one aspect of the present disclosure, a hot water seat system of a fuel cell vehicle includes a hot water circulating part that adjusts a temperature of hot water of a high temperature, which is discharged from a fuel cell stack, to a preset target temperature range, a processor that controls a flow of the hot water of the hot water circulating part, and a hot water seat having a hot water pipe, in which the hot water, the temperature of which was adjusted to the target temperature range, flows via the hot water circulating part, and the hot water circulating part includes a first water tank that stores the hot water discharged from the fuel cell stack, and a second water tank that supplies the hot water in the target temperature range to the hot water seat, based on the hot water of a high temperature, which is received from the first water tank and cold water provided from a cold water tank.

According to one implementation, the hot water circulating part further may include a third water tank, in which a chiller for generating cooling water is disposed, and the processor may supply the hot water in the second water tank to the third water tank based on that a water level of the second water tank is greater than or equal to a first threshold water level in a period, for which the hot water in the second water tank is supplied to the hot water seat.

According to one implementation, the process may supply the hot water in the first water tank to the second water tank based on that a water level of the first water tank is more than a second threshold water level in a state, in which a temperature of the hot water in the second water tank is less than the target temperature range.

According to one implementation, the process may drive a heater disposed in the second water tank based on that the water level of the first water tank is smaller than or equal to the second threshold water level in a state, in which a temperature of the hot water in the second water tank is less than the target temperature range.

According to one implementation, the process may supply the cold water in the cold water tank to the second water tank based on that a water level of the cold water tank is more than a third threshold water level when a temperature of the hot water in the second water tank is more than the target temperature range.

According to one implementation, the process may drive the chiller disposed in the third water tank based on that the water level of the cold water tank is smaller than or equal to the third threshold water level when the temperature of the hot water in the second water tank is more than the target temperature range.

According to one implementation, the processor may drive the chiller while supplying the hot water from the first water tank to the third water tank based on that a water level of the third water tank is less than a fourth threshold water level.

According to one implementation, the processor may supply the hot water from the first water tank to the third water tank when a temperature of the third water tank is lower than the target temperature range.

According to one implementation, the processor may drive a chiller disposed in a third water tank connected to the second water tank in a state, in which supply of the cold water from the cold water tank is interrupted, based on that a water level of the cold water tank is smaller than or equal to a fifth threshold water level in a period, for which the hot water in the second water tank is supplied to the hot water seat.

According to one implementation, the process may detect a water level of the first water tank, the second water tank, the third water tank, or the cold water tank, in response to a start-up, and discharge water in one of the first water tank, the second water tank, the third water tank, or the cold water tank, the water level of which is greater than or equal to a sixth threshold water level, to a ground surface.

According to another aspect of the present disclosure, a method for controlling a hot water seat system of a fuel cell vehicle includes storing hot water discharged from a fuel cell in a first water tank, supply the hot water in the first water tank to the second water tank in response to a hot water seat operating signal, and supply cold water stored in a cold water tank to a second water tank, sensing a temperature of the hot water stored in the second water tank, and supplying the hot water in the second water tank to a hot water seat when the temperature of the hot water in the second water tank is in a target temperature range.

According to one implementation, the method may further include, in a period, for which the hot water in the second water tank is supplied to the hot water seat, detecting a water level of the second water tank, and supplying the hot water in the second water tank to a third water tank based on that the water level of the second water tank is greater than or equal to a first threshold water level.

According to one implementation, the method may further include, in a state, in which the temperature of the hot water in the second water tank is less than the target temperature range, supplying the hot water in the first water tank to the second water tank based on that a water level of the first water tank is more than a second threshold water level.

According to one implementation, the method may further include, in a state, in which the temperature of the hot water in the second water tank is less than the target temperature range, driving a heater disposed in the second water tank based on that the water level of the first water tank is smaller than or equal to the second threshold water level.

According to one implementation, the method may further include, when the temperature of the hot water in the second water tank is more than the target temperature range, detecting a water level of the cold water tank, and supplying the cold water in the cold water tank to the second water tank based on that the water level of the cold water tank is more than a third threshold water level.

According to one implementation, the method may further include, when the temperature of the hot water in the second water tank is more than the target temperature range, driving a chiller disposed in the third water tank based on that the water level of the cold water tank smaller than or equal to than the third threshold water level.

According to one implementation, the driving of the chiller disposed in the third water tank may further include supplying the hot water from the first water tank to the third water tank based on that a water level of the third water tank is less than a fourth threshold water level.

According to one implementation, the driving of the chiller disposed in the third water tank may further include supplying the hot water from the first water tank to the third water tank when a temperature of the third water tank is lower than the target temperature range.

According to one implementation, the method may further include, in a period, for which the hot water in the second water tank is supplied to the hot water seat, detecting a water level of the cold water tank, and driving a chiller disposed in a third water tank connected to the second water tank in a state, in which supply of the cold water from the cold water tank is interrupted, based on that the water level of the cold water tank is smaller than or equal to a fifth threshold water level.

According to one implementation, the method may further include detecting a water level of the first water tank, the second water tank, the third water tank, or the cold water tank, in response to a start-up, and discharging water in one of the first water tank, the second water tank, the third water tank, of the cold water tank, a water level of which is greater than or equal to a sixth threshold water level, to a ground surface.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
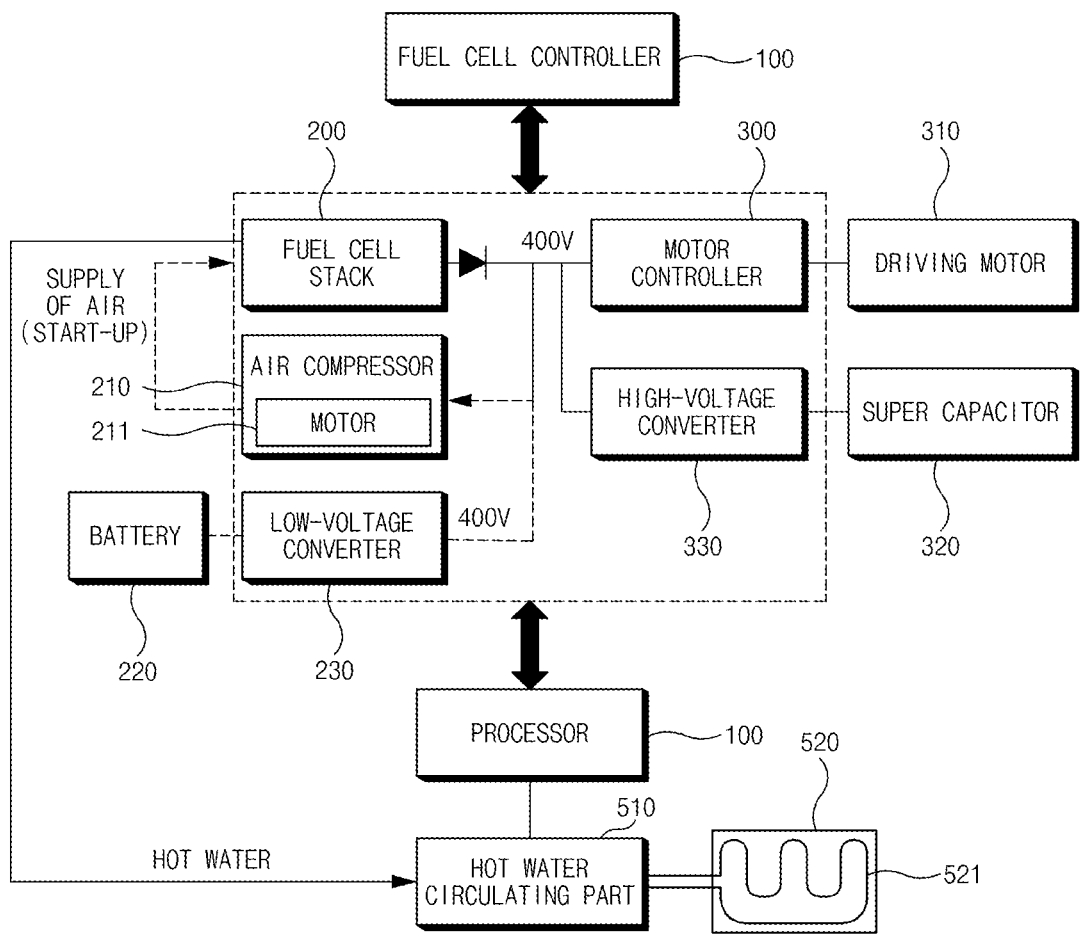
FIG. 1 shows an example configuration of a fuel cell vehicle including a hot water seat system.

Hereinafter, some implementations of the present disclosure will be described in detail with reference to the exemplary drawings. In adding the reference numerals to the components of each drawing, it should be noted that the identical or equivalent component is designated by the identical numeral even when they are displayed on other drawings. Further, in describing the implementation of the present disclosure, a detailed description of the related known configuration or function will be omitted when it is determined that it interferes with the understanding of the implementation of the present disclosure.

In describing the components of the implementation according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, implementations of the present disclosure will be described in detail with reference to FIGS. 1 to 9.

FIG. 1 shows an example configuration of a fuel cell vehicle including a hot water seat system according to an implementation of the present disclosure.

Referring to FIG. 1, a fuel cell vehicle including a hot water seat system according to an implementation of the present disclosure may include a fuel cell stack 200, an air compressor 210, a battery 220, a low-voltage converter 230, a motor controller 300, a driving motor 310, a super capacitor 320, a high-voltage converter 330, and a hot water seat system.

The fuel cell stack 200 may convert chemical energy to electric energy as a fuel gas and oxygen electrochemically react with each other. The fuel cell stack 200 may include one or more unit cells, and the unit cell may receive a hydrogen gas included in a fuel gas and air, induce an oxidation/reduction reaction, and generate electric energy. The unit cell may include a membrane/electrode assembly (MEA) that is protected from the outside by an end plate and oxidizes and reduces hydrogen gas and air, and one or more separators for supplying the fuel gas and the air to the membrane/electrode assembly.

The fuel cell stack 200 may generate water as a by-product in a process of generating electric energy. The fuel cell stack 200 may generate about 60 L to 65 L of water for a travel of 100 Km, and a temperature of the water generated by the fuel cell stack 200 may be a high temperature of about 70 degrees.

The air compressor 210 may supply compressed air to the fuel cell stack 200. To achieve this, the air compressor 210 may include a motor 211 configured to rotate a fan.

The battery 220 may provide electric power for driving the motor 211 of the air compressor 210.

The low-voltage converter 230 may boost a voltage of the battery 220 and provide the boosted voltage to the motor 211. When the low-voltage converter 230 receives a voltage of a minimum input voltage or more, the voltage of the battery 220 may be boosted to a voltage, by which the motor 211 may be driven.

The driving motor 310 may be operated by the motor controller 300, and may receive electric power from a fuel cell or the super capacitor 320 to drive the vehicle. Furthermore, the driving motor 310 may provide electric power generated through regenerative braking to the super capacitor 320.

The super capacitor 320 may receive electric power generated by the driving motor 310 operated as a power generator during braking of the vehicle in the regenerative braking process, for charging. The voltage charged in the super capacitor 320 may assist an output of the driving motor 310, and may be consumed for driving of the air compressor 210 during a start-up.

The high-voltage converter 330 may boost the voltage charged in the super capacitor 320 to a voltage required by the driving motor 310.

The hot water seat system may include a processor 100, a hot water circulating part 510, and a hot water seat 520.

Figure 2:
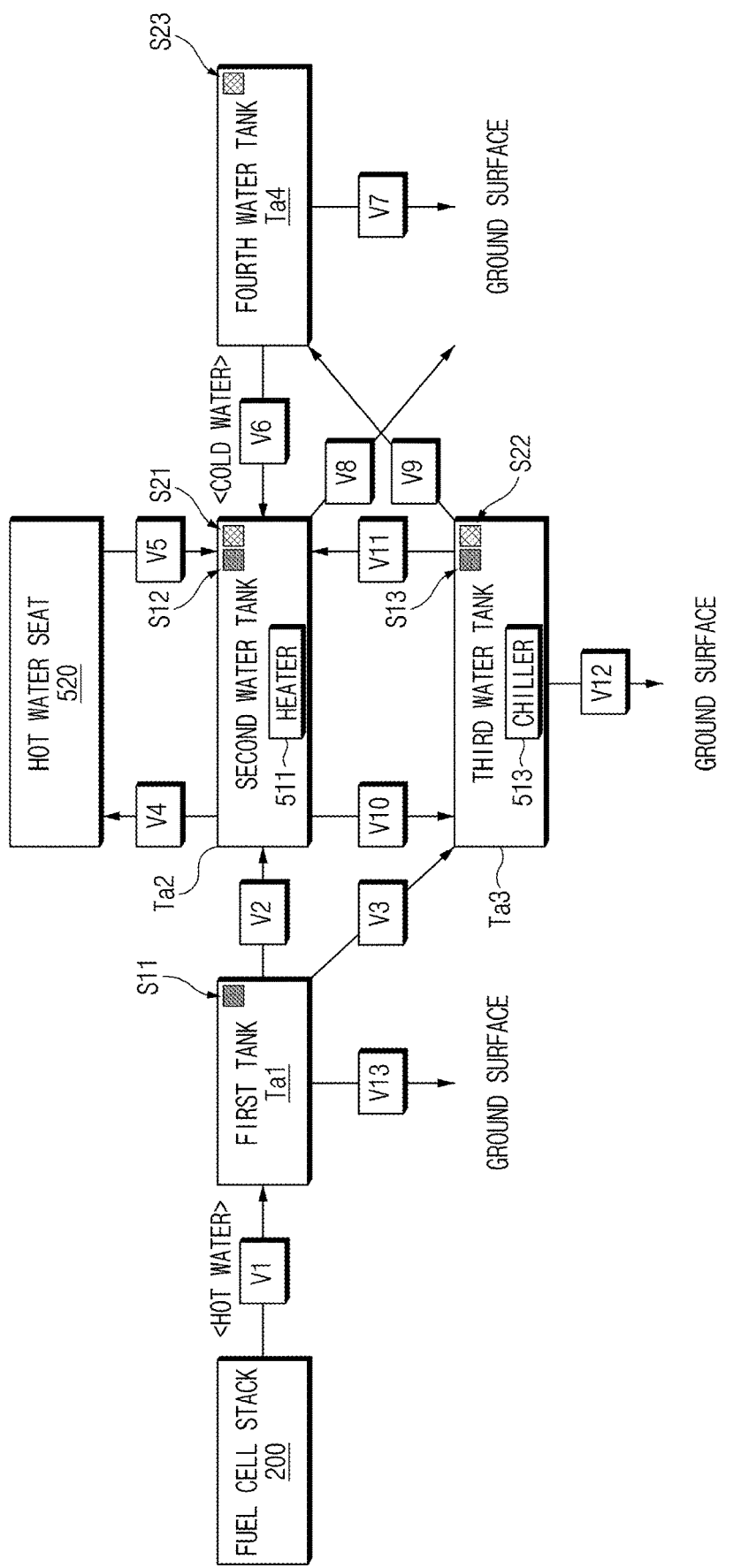
FIG. 2 shows an example configuration of a hot water seat system.

Referring to FIG. 2, the hot water seat system will be described in more detail as follows.

FIG. 2 shows an example configuration of the hot water seat system.

Referring to FIG. 2, the hot water seat system according to an implementation of the present disclosure may include the processor 100.

The processor 100 corresponds to an upper level controller, and may control a driving device and the hot water circulating part 510.

The processor 100 may generate electric energy by controlling the fuel cell stack 200.

Furthermore, the processor 100 may maintain a temperature of a second water tank Ta2 that provides hot water to the hot water seat 520 at a proper temperature, by controlling the hot water circulating part 510. Furthermore, the processor 100 may adjust the water amounts of first to fourth water tanks Ta1, Ta2, Ta3, and Ta4.

To achieve this, the processor 100 may generate first to thirteenth control signals. The first to thirteenth control signals may control opening and locking of first to thirteenth valves V1 to V13. For example, the first control signal may be a signal that controls opening and locking of the first valve V1.

The hot water circulating part 510 may store hot water of a high temperature, which is discharged from the fuel cell stack 200, under the control of the processor 100, and may maintain a temperature of the hot water of a high temperature in a target temperature range. The target temperature range may be a temperature of the hot water provided to the hot water seat 520, and for example, may be set to a range of 25 degrees to 35 degrees.

To achieve this, the hot water circulating part 510 may include the first to fourth water tanks Ta1, Ta2, Ta3, and Ta4, and the first to thirteenth valves V1 to V13.

The first water tank Ta1 may primarily store the hot water of the high temperature, which is received from the fuel cell stack 200.

The second water tank Ta2 may be coupled to the hot water seat 520, and may provide water in the target temperature range to the hot water seat 520.

The third water tank Ta3 may be coupled to the first water tank Ta1, the second water tank Ta2, and the fourth water tank Ta4, and may receive hot water of a high temperature, hot water, and cold water to adjust temperatures thereof.

The fourth water tank Ta4 may store the water that is synchronized with an external temperature. With the assumption that the hot water seat 520 is used in winter, in which the external temperature is low, the fourth water tank Ta4 may store cold water, and thus may be referred to as a cold water tank.

Water level sensors may be disposed in the first to fourth water tanks Ta1, Ta2, Ta3, and Ta4. A first water level sensor S11 may sense a water level of the first water tank Ta1. Similarly, a second water level sensor S12 may sense a water level of the second water tank Ta2, a third water level sensor S13 may sense a water level of the third water tank Ta3, and a fourth water level sensor S14 may sense a water level of the fourth water tank Ta4.

Temperature sensors may be disposed in the second and third water tanks Ta2 and Ta3. A first temperature sensor S21 may sense a temperature of water stored in the second water tank Ta2, and a second temperature sensor S22 may sense a temperature of water stored in the third water tank Ta3.

The first valve V1 may control a water passage between the fuel cell stack 200 and the first water tank Ta1. By opening the first valve V1, the hot water of the high temperature, which is discharged from the fuel cell stack 200, may be supplied to the first water tank Ta1.

The second valve V2 may control a water passage between the first water tank Ta1 and the second water tank Ta2. By opening the second valve V2, the hot water in the first water tank Ta1 may be supplied to the second water tank Ta2.

The third valve V3 may control a water passage between the first water tank Ta1 and the third water tank Ta3. By opening the third valve V3, the hot water in the first water tank Ta1 may be supplied to the third water tank Ta3.

The fourth valve V4 may control a water passage between the second water tank Ta2 and the hot water seat 520. By opening the fourth valve V4, the hot water in the second water tank Ta2 may be supplied to the hot water seat 520.

The fifth valve V5 may control a water passage between the hot water seat 520 and the second water tank Ta2. By opening the fifth valve V5, the hot water in the hot water seat 520 may be supplied to the second water tank Ta2.

The sixth valve V6 may control a water passage between the fourth water tank Ta4 and the second water tank Ta2. By opening the sixth valve V6, the cold water in the fourth water tank Ta4 may be supplied to the second water tank Ta2.

The seventh valve V7 may control a water passage between the fourth water tank Ta4 and the ground surface. By opening the seventh valve V7, the cold water in the fourth water tank Ta4 may be discharged to the ground surface.

The eighth valve V8 may control a water passage between the second water tank Ta2 and the ground surface. By opening the eighth valve V8, the hot water in the second water tank Ta2 may be discharged to the ground surface.

The ninth valve V9 may control a water passage between the third water tank Ta3 and the fourth water tank Ta4. By opening the ninth valve V9, the hot water or cold water in the third water tank Ta3 may be supplied to the fourth water tank Ta4.

The tenth valve V10 may control a water passage between the second water tank Ta2 and the third water tank Ta3. By opening the tenth valve V10, the hot water in the second water tank Ta2 may be supplied to the third water tank Ta3.

The eleventh valve V11 may control a water passage between the third water tank Ta3 and the second water tank Ta2. By opening the eleventh valve V11, the cold water in the third water tank Ta3 may be supplied to the second water tank Ta2.

The twelfth valve V12 may control a water passage between the third water tank Ta3 and the ground surface. By opening the twelfth valve V12, the cold water in the third water tank Ta3 may be discharged to the ground surface.

The thirteenth valve V13 may control a water passage between the first water tank Ta1 and the ground surface. By opening the thirteenth valve V13, the cold water in the first water tank Ta1 may be discharged to the ground surface.

The hot water seat 520 may include a hot water pipe 521 provided at an interior of a seat, and the hot water pipe 521 may receive the hot water in the target temperature range from the hot water circulating part 510.

Figure 3:
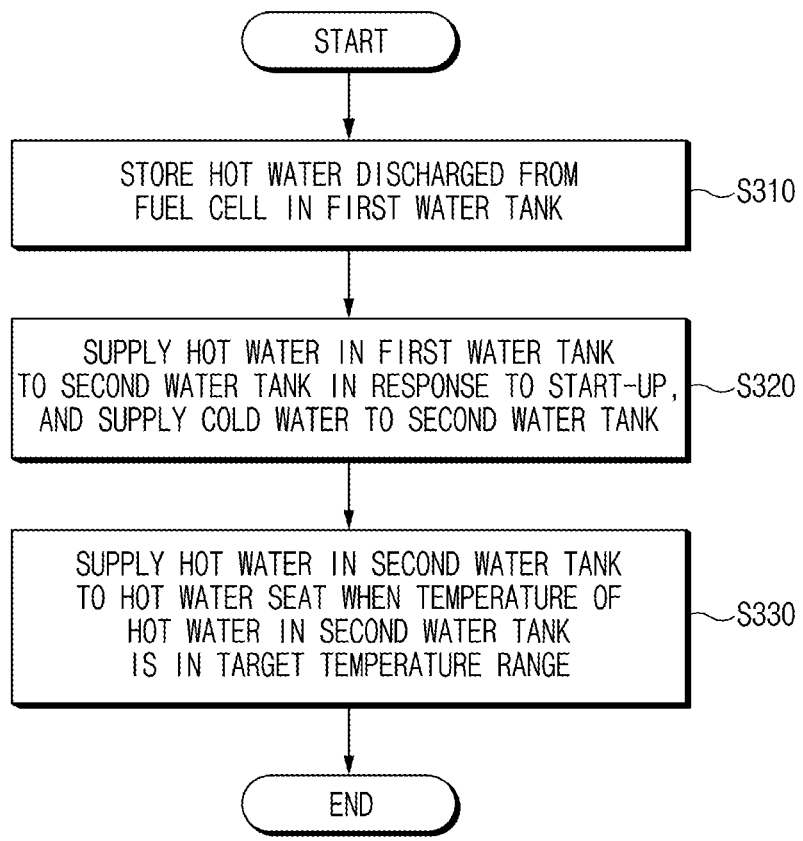
FIG. 3 is a flowchart illustrating an example method for controlling a hot water seat system.

FIG. 3 is a flowchart illustrating an example method for controlling the hot water seat system according to an implementation of the present disclosure.

Referring to FIGS. 2 and 3, the method for controlling the hot water seat system according to an implementation will be described as follows.

In S310, the processor 100 may control the hot water circulating part 510 such that the hot water discharged from the fuel cell stack 200 is stored in the first water tank Ta1.

To achieve this, the processor 100 may store the hot water of the high temperature, which is discharged from the fuel cell stack 200, in the first water tank Ta1 by controlling the first valve V1.

In S320, the processor 100 may control the hot water circulating part 510 such that the hot water in the first water tank Ta1 is supplied to the second water tank Ta2 and the cold water in the fourth water tank Ta4 is supplied to the second water tank Ta2.

To achieve this, the processor 100 may open the second valve V2 and the sixth valve V6. In some implementations, the second valve V2 and the sixth valve V6 may be opened in response to an operation signal that instructs an operation of the hot water seat 520.

The hot water of a high temperature, which is received from the first water tank Ta1, and the cold water received from the fourth water tank Ta4 may be mixed, and the second water tank Ta2 may contain the hot water of a temperature that is close to the target temperature range.

In S330, the processor 100 may supply the hot water in the second water tank Ta2 to the hot water seat when a temperature of the hot water in the second water tank Ta2 is within the target temperature range.

To achieve this, the processor 100 may sense a temperature of the second water tank Ta2. The processor 100 may open the fourth valve V4 when the temperature of the second water tank Ta2 is within the target temperature range.

Hereinafter, the method for controlling the hot water system according to an implementation of the present disclosure will be described in detail as follows.

Figure 4:
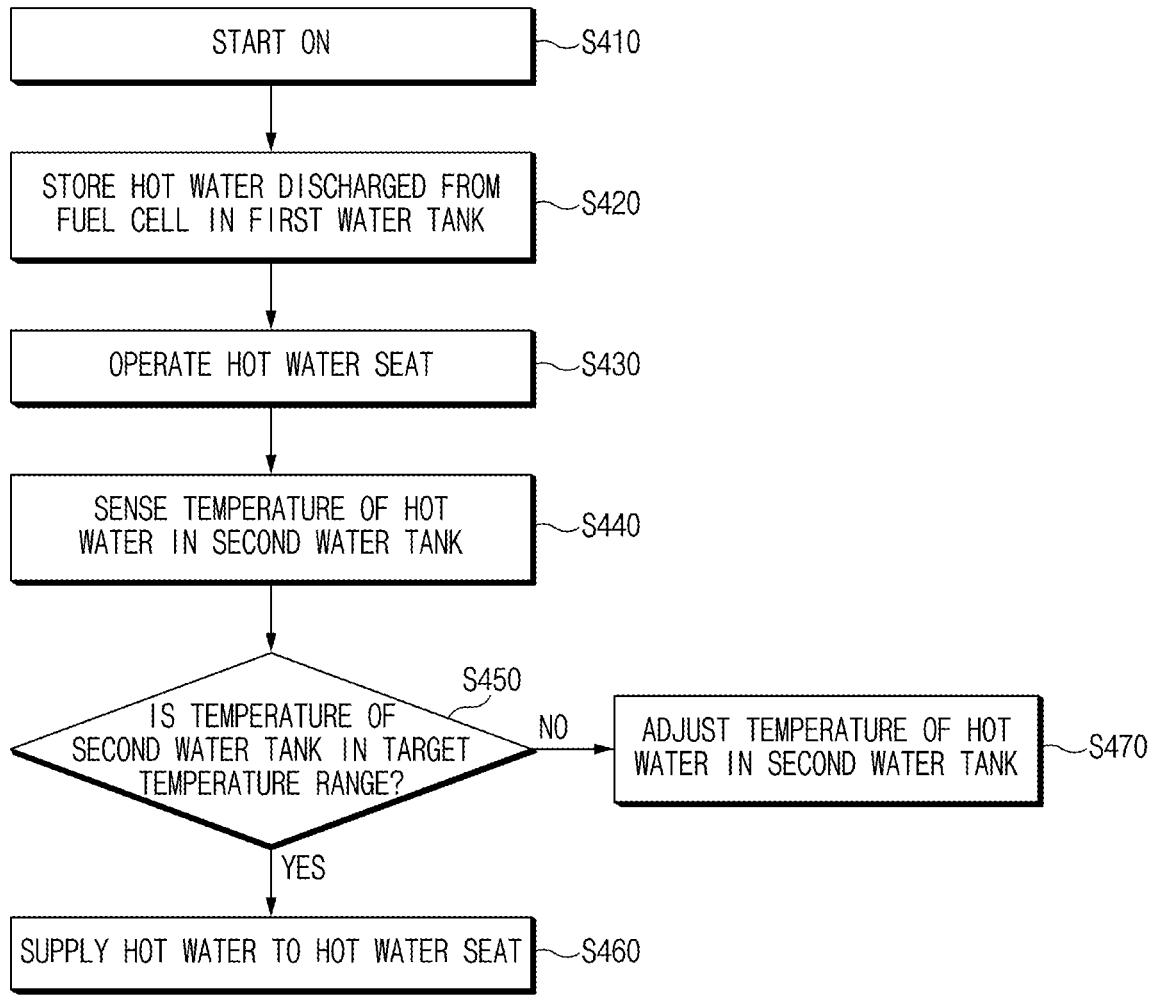
FIG. 4 is a flowchart illustrating an example method for controlling a hot water system.

FIG. 4 is a flowchart illustrating an example method for controlling the hot water system according to another implementation.

Referring to FIG. 4, a method for controlling the hot water seat system in response to a hot water seat operating signal will be described as follows.

In S410 and S420, the processor 100 may store the hot water discharged from the fuel cell stack in the first water tank Ta1, based on that the vehicle is started up.

In S430 and S440, the processor 100 may sense the temperature of the hot water in the second water tank Ta2 in response to the hot water seat operating signal. The processor 100 may identify the temperature of the hot water in the second water tank Ta2, based on a sensing result from the second temperature sensor S22.

In S450, the processor 100 may determine whether the temperature of the second water tank Ta2 is in the target temperature range.

In S460, when the temperature of the hot water in the second water tank Ta2 is in the target temperature range, the processor 100 may supply the hot water to the hot water seat 520. In some implementations, the processor 100 may supply the hot water in the target temperature range, which is contained in the second water tank Ta2, to the hot water seat 520 by opening the fourth valve V4.

In S470, when the temperature of the hot water in the second water tank Ta2 deviates from the target temperature range, the processor 100 may adjust the temperature of the hot water in the second water tank Ta2.

In S470, the processor 100 may supply the hot water of a high temperature, which is stored in the first water tank Ta1, to the second water tank Ta2 when the temperature of the second water tank Ta2 is less than the target temperature range. Furthermore, supply of the cold water in the fourth water tank Ta4 to the second water tank Ta2 may be interrupted. In this process, when the water level of the first water tank Ta1 is low, the processor 100 may raise a temperature of the hot water in the second water tank Ta2 by driving a heater 511 of the second water tank Ta2.

In S470, the processor 100 may supply the cold water in the fourth water tank Ta4 to the second water tank Ta2 while interrupting supply of the hot water in the first water tank Ta1 to the second water tank Ta2 when the temperature of the second water tank Ta2 is more than the target temperature range. When the water level of the fourth water tank Ta4 is low in the process, the processor 100 may generate cold water in the third water tank Ta3 by driving a chiller 513, and may supply the cold water in the third water tank Ta3 to the second water tank Ta2.

A detailed implementation of S470 will be described below.

Because a process of operating the hot water seat includes a procedure of supplying the hot water in the first water tank Ta1, an amount of the hot water in the second water tank Ta2 may be increased in proportion to the hot water seat operating time period. Accordingly, it is necessary to adjust the amount of the hot water in the second water tank Ta2. An implementation of adjusting the amount of the hot water in the second water tank Ta2 will be discussed with reference to FIG. 5 as follows.

Figure 5:
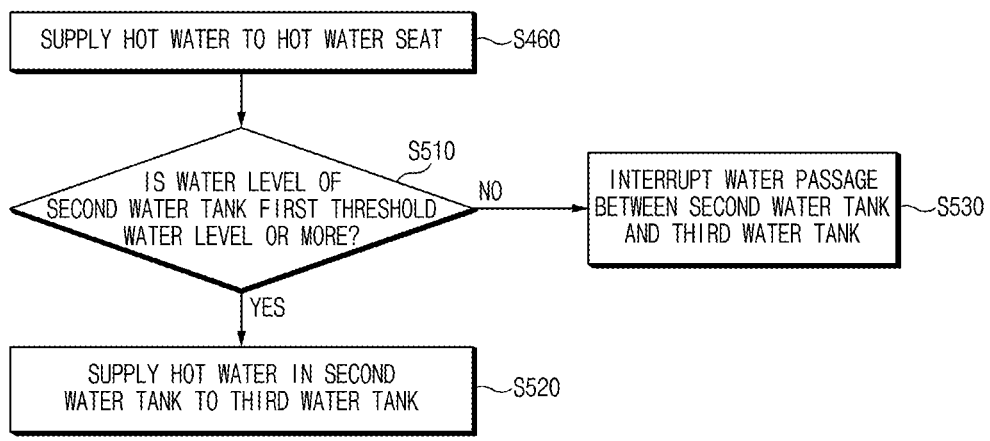
FIG. 5 is a flowchart illustrating an implementation for adjusting a water level of a second water tank.

FIG. 5 is a flowchart illustrating an implementation for adjusting the water level of the second water tank.

FIG. 5 may be an implementation that is continued after procedure S460 illustrated in FIG. 4. Referring to FIG. 5, while supplying the hot water to the hot water seat 520 through procedure S470, in S510, the processor 100 may determine the water level of the second water tank Ta2.

In S520, when the water level of the second water tank Ta2 is greater than or equal to a first threshold water level, the hot water in the second water tank Ta2 may be supplied to the third water tank Ta3. To achieve this, the processor 100 may open the tenth valve V10. The first threshold water level may be set to around 90% of a maximum capacity of the second water tank Ta2.

In S530, when the water level of the second water tank Ta2 is less than the first threshold water level, the processor 100 may interrupt a passage between the second water tank Ta2 and the third water tank Ta3. That is, the processor 100 may close the tenth valve V10.

In some implementations, the processor 100 may prevent the second water tank Ta2 from being saturated.

Figure 6:
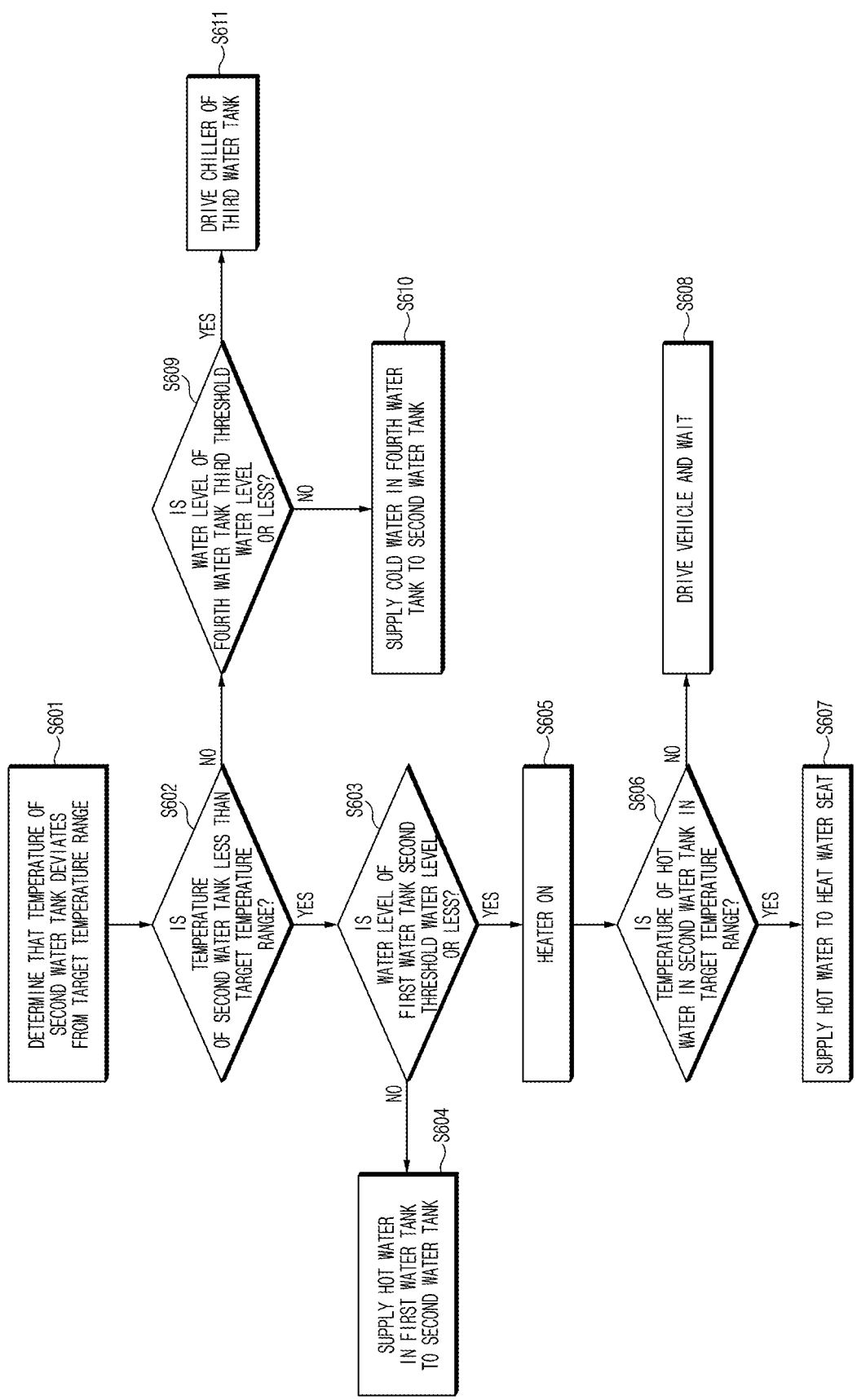
FIG. 6 is a flowchart illustrating an example procedure for controlling a hot water circulating part according to a temperature of the second water tank.

FIG. 6 is a flowchart illustrating an example procedure for controlling the hot water circulating part according to a temperature of the second water tank. That is, FIG. 6 may correspond to the detailed implementation of procedure S470 illustrated in FIG. 4.

Referring to FIG. 6, a method for adjusting the temperature of the second water tank will be discussed as follows.

In S601, when it is determined that the temperature of the hot water in the second water tank Ta2 deviates from the target temperature range, the processor 100 may determine whether the temperature of the hot water in the second water tank Ta2 is less than the target temperature in S602.

In S603, the processor 100 may determine whether the water level of the first water tank Ta1 is lower than or equal to a second threshold water level when the temperature of the second water tank Ta2 is lower than the target temperature range. The second threshold water level may be set to around 10% of a maximum capacity of the first water tank Ta1.

In S604, when the water level of the first water tank Ta1 is greater than the second threshold water level, the processor 100 may supply the hot water in the first water tank Ta1 to the second water tank Ta2. That is, the processor 100 may open the second valve V2. The processor 100 may increase the temperature of the second water tank TA2 by supplying the hot water of a high temperature, which is contained in the first water tank Ta1, to the second water tank Ta2. In S604, to prevent the cold water from being supplied to the second water tank Ta2, the processor 100 may close the sixth valve V6.

In S605, when the water level of the first water tank Ta1 is lower than the second threshold water level, the processor 100 may drive the heater 511 disposed in an interior of the second water tank Ta2. Through S605, when the water level of the first water tank Ta1 is lower than or equal to the second threshold water level, the processor 100 may increase the temperature of the second water tank Ta2 while preventing discharge of the hot water in the first water tank Ta1.

In S606, the processor 100 may determine whether the temperature of the hot water in the second water tank Ta2 is in the target temperature range.

In S607, the processor 100 may supply the hot water in the second water tank Ta2 to the hot water seat 520 when the temperature of the hot water in the second water tank Ta2 is within the target temperature range.

In S608, when the temperature of the hot water in the second water tank Ta2 deviates from the target temperature range, the processor 100 may monitor the water level of the first water tank Ta1 while maintaining driving of the vehicle. The water amount of the first water tank Ta1 may be increased by the amount of the hot water of a high temperature, which is discharged from the fuel cell stack 200 as the vehicle is driven, and accordingly, the temperature of the second water tank Ta2 may be increased through procedure S604.

In S609, the processor 100 may compare the water level of the fourth water tank Ta4 with a third threshold water level when the temperature of the hot water in the second water tank Ta2 is greater than the target temperature range.

In S610, when the water level of the fourth water tank Ta4 is greater than the third threshold water level, the processor 100 may supply the cold water in the fourth water tank Ta4 to the second water tank Ta2. In some implementations, the third threshold water level may be set to around 10% of a maximum capacity of the fourth water tank Ta4.

Furthermore, in S610, the processor 100 may prevent the hot water from the first water tank Ta1 from being supplied to the second water tank Ta2, by interrupting the second valve V2.

In S611, when the water level of the fourth water tank Ta4 is lower than or equal to the third threshold water level, the processor 100 may generate cold water by driving the chiller 513 of the third water tank Ta3.

In S611, an implementation of adjusting the temperature of the second water tank Ta2 based on the cold water generated by driving the chiller 513 will be discussed with reference to FIG. 7 as follows.

Figure 7:
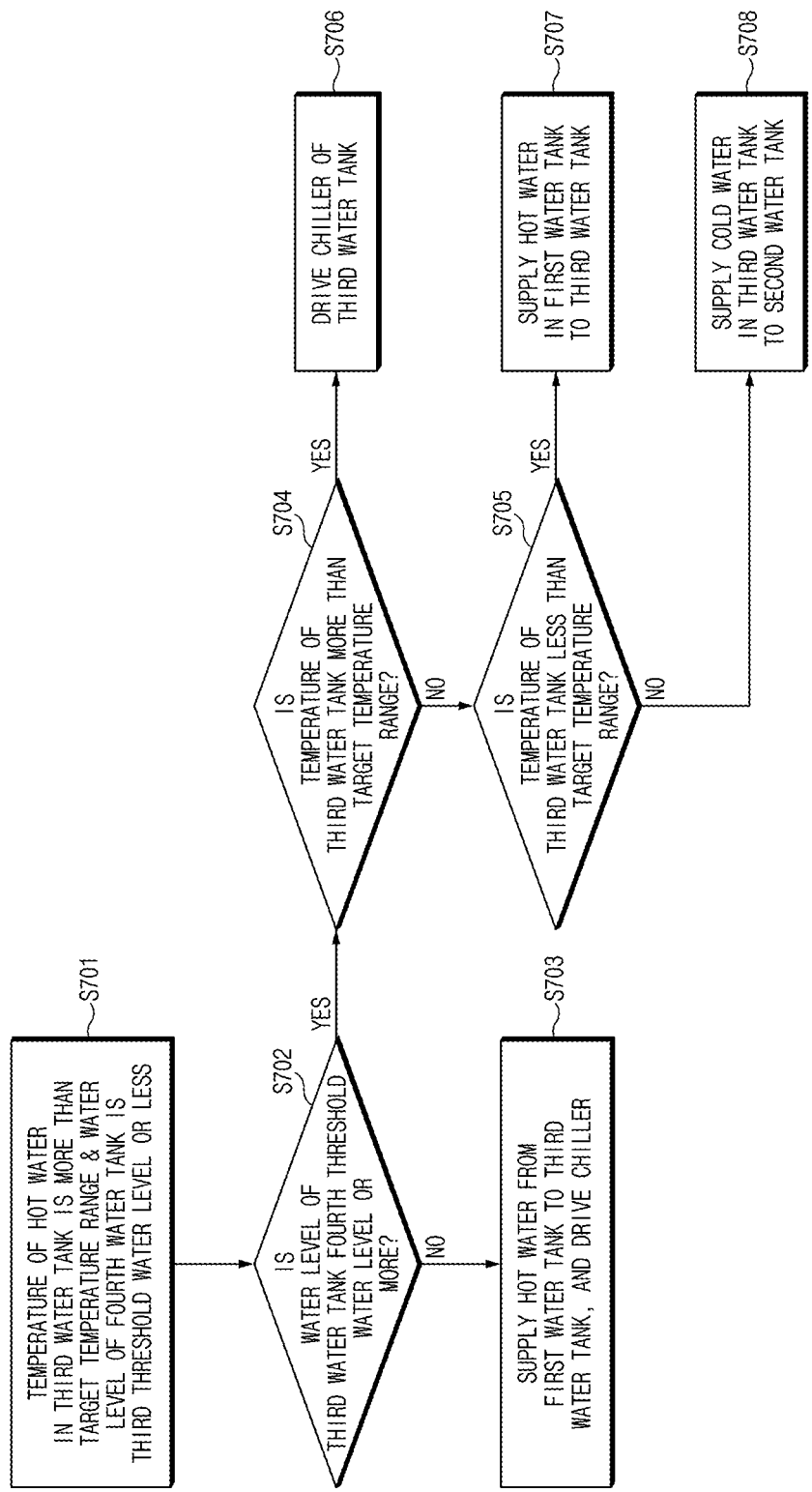
FIG. 7 is a flowchart illustrating an implementation for operating a chiller.

FIG. 7 is a flowchart illustrating an implementation for driving the chiller.

Referring to FIG. 7, a method for driving the chiller will be discussed in detail as follows.

The implementation of FIG. 7, as in S701, may be performed based on that the temperature of the hot water of the second water tank Ta2 is greater than the target temperature range and the water level of the fourth water tank Ta4 is lower than or equal to the third threshold water level.

In S701, because the temperature of the hot water in the second water tank Ta2 is not in the target temperature range, procedure S701 may include a procedure of closing the fourth valve V4 such that the hot water in the second water tank Ta2 is prevented from being supplied to the hot water seat 520.

Furthermore, because the water level of the fourth water tank Ta4 is low in S701, procedure S701 may include a procedure of closing the sixth valve V6 such that the cold water in the fourth water tank Ta4 is prevented from being supplied to the second water tank Ta2.

Furthermore, because the temperature of the hot water in the second water tank Ta2 is greater than the target temperature range in S701, procedure S701 may include a procedure of closing the second valve V2 such that the hot water of a high temperature, which is stored in the first water tank Ta1 is prevented from being supplied to the second water tank Ta2.

Furthermore, because the hot water in the second water tank Ta2, cannot receive the cold water from the fourth water tank Ta4 in S701, a procedure of opening the tenth valve V10 may be included to provide the hot water in the second water tank Ta2 to the third water tank Ta3, in which the chiller 513 is disposed. At the same time, procedure S701 may include a procedure of closing the eleventh valve V11 to prevent the hot water in the third water tank Ta3 from being supplied to the second water tank Ta2 in a state, in which the temperatures are not adjusted.

In S702, the processor 100 may compare the water level of the third water tank Ta3 with a fourth threshold water level. The fourth threshold water level may be set to around 10% of a maximum capacity of the third water tank Ta3.

In S703, when the water level of the third water tank Ta3 is lower than the fourth threshold water level, the processor 100 may supply the hot water in the first water tank Ta1 to the third water tank Ta3. To achieve this, the processor 100 may open the third valve V3. Furthermore, the processor 100 may close the tenth valve V10 and the eleventh valve V11 to interrupt a passage between the second water tank Ta2 and the third water tank Ta3. In this way, the processor 100 may drive the chiller 513 while supplementing the hot water from the first water tank Ta1.

In S704, it may be determined whether the temperature of the third water tank Ta3 is greater than the target temperature range, based on that the water level of the third water tank Ta3 being greater than or equal to the fourth threshold water level.

In S706, when the temperature of the third water tank Ta3 is greater than the target temperature range, the processor 100 may decrease a temperature of the hot water in the third water tank Ta3 by driving the chiller 513 of the third water tank Ta3. In S706, to interrupt the hot water introduced into the third water tank Ta3, the processor 100 may interrupt the third valve V3 and the tenth valve V10.

When the temperature of the third water tank Ta3 is not greater than the target temperature range, the processor 100 may determine whether the temperature of the third water tank Ta3 is lower than the target temperature range, in S705.

In S707, when the temperature of the third water tank Ta3 is lower than the target temperature range, the processor 100 may supply the hot water in the first water tank Ta1 to the third water tank Ta3. To achieve this, the processor 100 may open the third valve V3. Furthermore, to prevent lowering of temperature, the processor 100 may interrupt the tenth valve V10.

S708 is a procedure when the temperature of the third water tank Ta3 corresponds to the target temperature range, the processor 100 may supply the hot water in the third water tank Ta3 to the second water tank Ta2, in S708. In S708, to prevent hot water of another temperature from being introduced into the third water tank Ta3, the processor 100 may interrupt the third valve V3 and the tenth valve V10.

The above-described implementations may be procedures performed in a state, in which the vehicle is started up. The processor 100 according to an implementation of the present disclosure may open the ninth valve V9 and close all the other valves, based on the engine being switched off. Accordingly, when the engine of the vehicle is switched off, the fourth water tank Ta4 may be filled with the water received from the third water tank Ta3.

Because the fourth water tank Ta4 cannot receive water in a time period, for which the hot water is supplied to the hot water seat 520, the water in the fourth water tank Ta4 may be gradually decreased while an operation of the hot water seat 520 is progressed. Because the cold water in the fourth water tank Ta4 is used to adjust the temperature of the hot water in the second water tank Ta2, a procedure for supplying the cold water to the second water tank Ta2 when the cold water level in the fourth water tank Ta4 is low, and the implementation will be discussed with reference to FIG. 8 as follows.

Figure 8:
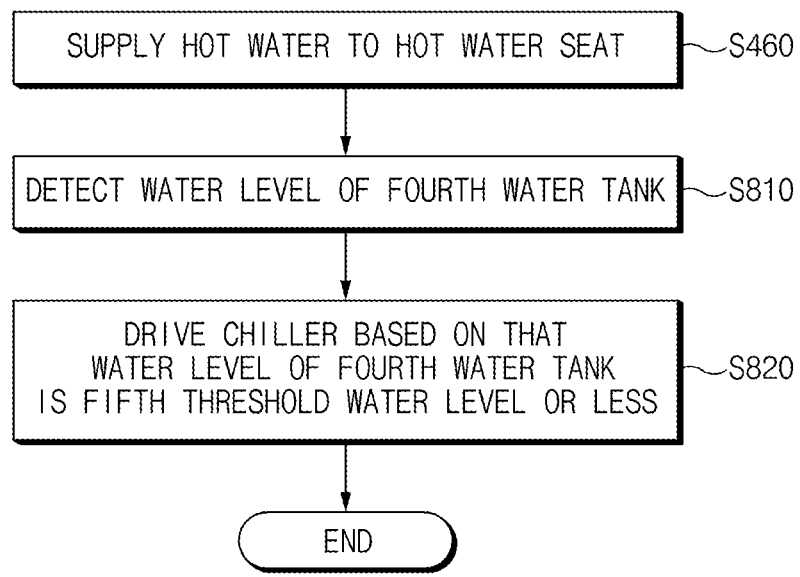
FIG. 8 is a flowchart illustrating another implementation for adjusting a temperature of hot water in the second water tank.

FIG. 8 is a flowchart illustrating another implementation for adjusting the temperature of the hot water in the second water tank.

In FIG. 8, procedure S460 may correspond to procedure S460 illustrated in FIG. 4.

In S810, the processor 100 may sense a water level of the fourth water tank Ta4.

In S820, the processor 100 may drive the chiller 513 based on that the water level of the fourth water tank Ta4 being lower than or equal to a fifth threshold water level. The procedure of driving the chiller 513 may be different according to a water amount of the third water tank Ta3, in which the chiller 513 is disposed, and the temperature of the third water tank Ta3. That is, in S820, the implementation for driving the chiller 513 may be performed based on S702, S703, S704, S705, S706, S707, and S708 of FIG. 7.

However, procedure S820 may be different from operations before procedure S820 in that the temperature of the second water tank Ta2 pertains to the target temperature range.

That is, because the temperature of the hot water in the second water tank Ta2 is in the target temperature range in S820, the processor 100 may maintain the opened state of the fourth valve V4 to maintain a process of supplying the hot water in the second water tank Ta2 to the hot water seat 520 in S820.

Because the water level of the fourth water tank Ta4 is low in S820, procedure S820 may include a procedure of closing the sixth valve V6 such that the cold water in the fourth water tank Ta4 is prevented from being supplied to the second water tank Ta2.

The method for controlling the hot water seat system according to the implementation of the present disclosure may include a procedure of detecting the water levels of the first to fourth water tanks Ta1 to Ta4. To achieve this, the processor 100 may operate the first to fourth water level sensors in response to a start-up of the vehicle.

The processor 100 may discharge water from one of the first water tank Ta1, the second water tank Ta2, the third water tank Ta3, or the fourth water tank Ta4, the water level of which is greater than or equal to the sixth threshold water level, to the ground surface. For example, when the water level of the first water tank Ta1 is greater than or equal to the sixth threshold water level, the processor 100 may open the thirteenth valve V13. Furthermore, when the water level of the second water tank Ta2 is greater than or equal to the sixth threshold water level, the processor 100 may open the eighth valve V8. Furthermore, when the water level of the third water tank Ta3 is greater than or equal to the sixth threshold water level, the processor 100 may open the twelfth valve V12. When the water level of the fourth water tank Ta4 is greater than or equal to the sixth threshold water level, the processor 100 may open the seventh valve V7.

The sixth threshold water level may be set to around 90% of maximum capacities of the water tanks.

Figure 9:
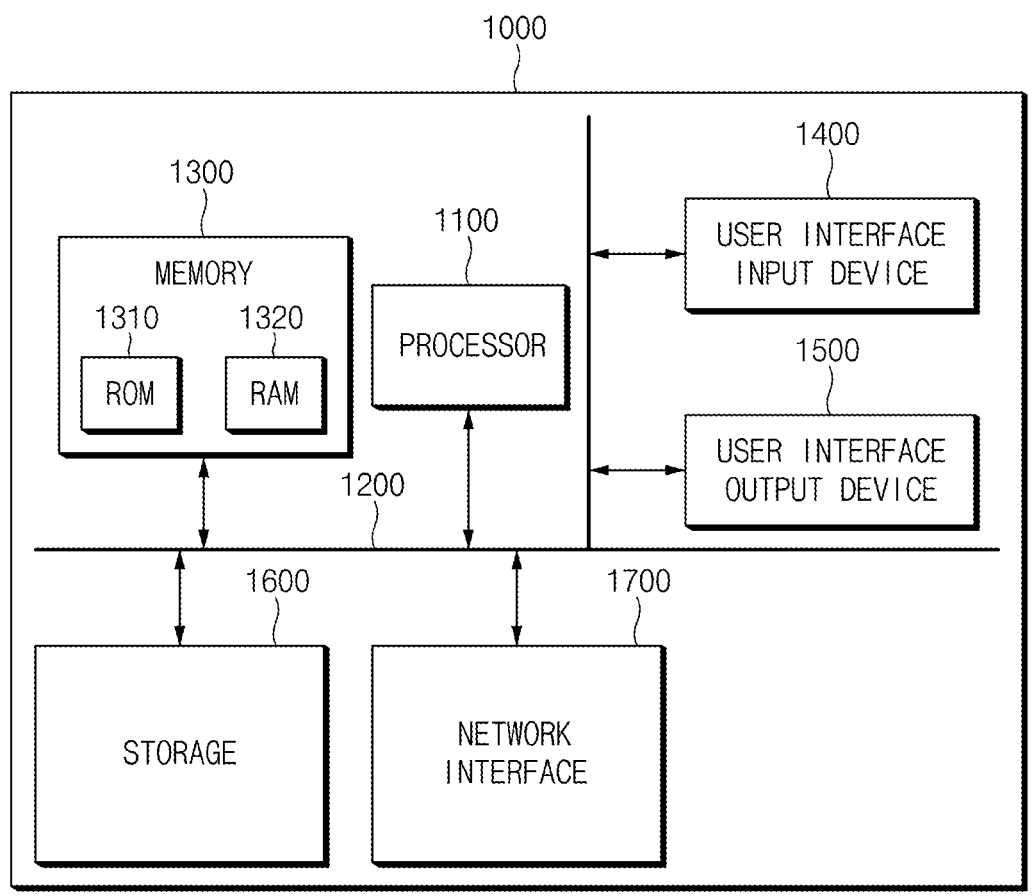
FIG. 9 shows an example computing system.

FIG. 9 shows an example computing system according to an implementation of the present disclosure.

Referring to FIG. 9, a computing system 1000 may include at least one processor 100, a memory 1300, a user interface input device 1400, a user interface output device 1500, storage 1600, and a network interface 1700, which are coupled with each other via a bus 1200.

The processor 100 may be a central processing unit (CPU) or a semiconductor device that processes instructions stored in the memory 1300 and/or the storage 1600. In particular, the processor 100 may include the processor 100 according to an implementation of the present disclosure.

The memory 1300 and the storage 1600 may include various volatile or nonvolatile storage media. For example, the memory 1300 may include a read only memory (ROM) and a random access memory (RAM).

Accordingly, the steps of the method or algorithm described in relation to the implementations of the present disclosure may be implemented directly by hardware executed by the processor 100, a software module, or a combination thereof. The software module may reside in a storage medium (that is, the memory 1300 and/or the storage 1600), such as a RAM, a flash memory, a ROM, an EPROM, an EEPROM, a register, a hard disk, a detachable disk, or a CD-ROM.

The exemplary storage medium is coupled to the processor 100, and the processor 100 may read information from the storage medium and may write information in the storage medium. In another implementation, the storage medium may be integrated with the processor 100. The processor and the storage medium may reside in an application specific integrated circuit (ASIC). The ASIC may reside in a user terminal. In another implementation, the processor and the storage medium may reside in the user terminal as an individual component.

According to an implementation of the present disclosure, power consumption for heating a heating wire may be remarkably reduced by removing the heating wire in an interior of a passenger seat.

Furthermore, according to an implementation of the present disclosure, devices for directly heating hot water may be reduced because a temperature of a passenger seat is increased by using hot water of a high temperature, which is discharged from the fuel cell.

In addition, the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Accordingly, the implementations disclosed in the present disclosure is not provided to limit the technical spirits of the present disclosure but provided to describe the present disclosure, and the scope of the technical spirits of the present disclosure is not limited by the implementations. Accordingly, the technical scope of the present disclosure should be construed by the attached claims, and all the technical spirits within the equivalent ranges fall within the scope of the present disclosure.

What is claimed is:

1. A hot water seat system of a fuel cell vehicle, comprising:
    a hot water circulating part configured to receive hot water that is discharged from a fuel cell stack and adjust a temperature of the hot water to a preset target temperature range;
    a processor configured to control a flow of the hot water at the hot water circulating part; and
    a hot water seat having a hot water pipe that is configured to receive the temperature adjusted hot water from the hot water circulating part,
    wherein the hot water circulating part includes:
        a first water tank configured to receive the hot water discharged from the fuel cell stack, and
        a second water tank configured, based on the temperature of the hot water, to use cold water provided from a cold water tank to adjust the temperature of the hot water to the target temperature range.

2. The hot water seat system of claim 1, wherein the hot water circulating part further includes:
    a third water tank including a chiller that is configured to generate cooling water, and
    wherein the processor is configured, based on a water level of the second water tank being greater than or equal to a first threshold water level in a time period, to supply the hot water from the second water tank to the third water tank.

3. The hot water seat system of claim 2, wherein the processor is configured, based on a water level of the first water tank being greater than a second threshold water level and the temperature of the hot water in the second water tank being lower than the target temperature range, to supply the hot water from the first water tank to the second water tank.

4. The hot water seat system of claim 3, wherein the processor is configured, based on the water level of the first water tank being lower than or equal to the second threshold water level and the temperature of the hot water in the second water tank being lower than the target temperature range, to operate a heater disposed at the second water tank.

5. The hot water seat system of claim 2, wherein the processor is configured, based on a water level of the cold water tank being greater than a third threshold water level and the temperature of the hot water in the second water tank being greater than the target temperature range, to supply the cold water from the cold water tank to the second water tank.

6. The hot water seat system of claim 5, wherein the processor is configured, based on the water level of the cold water tank being lower than or equal to the third threshold water level and the temperature of the hot water in the second water tank being greater than the target temperature range, to operate the chiller disposed at the third water tank.

7. The hot water seat system of claim 6, wherein the processor is configured, based on a water level of the third water tank being lower than a fourth threshold water level, to operate the chiller while supplying the hot water from the first water tank to the third water tank.

8. The hot water seat system of claim 6, wherein the processor is configured, based on the temperature of the hot water in the third water tank being lower than the target temperature range, to supply the hot water from the first water tank to the third water tank.

9. The hot water seat system of claim 2, wherein the processor is configured to (i) detect a water level of the first water tank, the second water tank, the third water tank, or the cold water tank, and (ii) based on the water level being greater than or equal to a sixth threshold water level, discharge water in one of the first water tank, the second water tank, the third water tank, or the cold water tank to a ground surface.

10. The hot water seat system of claim 1, wherein the processor is configured, based on a water level of the cold water tank being lower than a fifth threshold water level in a time period and a cold water supply from the cold water tank being interrupted, to operate a chiller disposed at a third water tank coupled to the second water tank.

11. A method for controlling a hot water seat system of a fuel cell vehicle, the method comprising:
    receiving hot water discharged from a fuel cell in a first water tank;
    based on receiving a hot water seat operating signal, supplying the hot water from the first water tank to a second water tank, and supplying cold water from a cold water tank to the second water tank;

measuring a temperature of the hot water in the second water tank; and based on the temperature of the hot water in the second water tank being within a target temperature range, supplying the hot water from the second water tank to a hot water seat.

12. The method of claim 11, further comprising:

detecting a water level of the second water tank; and based on the water level of the second water tank being greater than or equal to a first threshold water level, supplying the hot water from the second water tank to a third water tank, wherein the hot water in the second water tank is supplied to the hot water seat for a time period.

13. The method of claim 12, further comprising:

based on the temperature of the hot water in the second water tank being lower than the target temperature range and a water level of the first water tank being greater than a second threshold water level, supplying the hot water from the first water tank to the second water tank.

14. The method of claim 13, further comprising:

based on the temperature of the hot water in the second water tank being lower than the target temperature range and the water level of the first water tank being lower than or equal to the second threshold water level, operating a heater disposed at the second water tank.

15. The method of claim 12, further comprising:

based on the temperature of the hot water in the second water tank being greater than the target temperature range, detecting a water level of the cold water tank; and based on the water level of the cold water tank being greater than a third threshold water level, supplying the cold water from the cold water tank to the second water tank.

16. The method of claim 15, further comprising:

based on the temperature of the hot water in the second water tank being greater than the target temperature range and the water level of the cold water tank being lower than or equal to the third threshold water level, operating a chiller disposed at the third water tank.

17. The method of claim 16, wherein the operating of the chiller includes:

based on a water level of the third water tank being lower than a fourth threshold water level, supplying the hot water from the first water tank to the third water tank.

18. The method of claim 16, wherein the operating of the chiller includes:

based on a temperature of the third water tank being lower than the target temperature range, supplying the hot water from the first water tank to the third water tank.

19. The method of claim 12, further comprising:

detecting a water level of the first water tank, the second water tank, the third water tank, or the cold water tank; and based on the water level being greater than or equal to a sixth threshold water level, discharging water from one of the first water tank, the second water tank, the third water tank, of the cold water tank to a ground surface.

20. The method of claim 11, further comprising:

detecting a water level of the cold water tank; and based on a cold water supply from the cold water tank being interrupted and the water level of the cold water tank being lower than or equal to a fifth threshold water level, operating a chiller disposed at a third water tank coupled to the second water tank, wherein the hot water in the second water tank is supplied to the hot water seat for a time period.

* * * * *